United States Patent [19]

Shrinkle et al.

[11] Patent Number: 5,521,768
[45] Date of Patent: May 28, 1996

[54] LOW-POWER HARD DISK DRIVE SYSTEM ARCHITECTURE

[75] Inventors: Louis J. Shrinkle; John P. Squires, both of Boulder, Colo.

[73] Assignee: Conner Peripherals, Inc., San Jose, Calif.

[21] Appl. No.: 291,664

[22] Filed: Aug. 17, 1994

Related U.S. Application Data

[62] Division of Ser. No. 123,582, Sep. 17, 1993, Pat. No. 5,402,200, which is a continuation of Ser. No. 564,693, Aug. 7, 1990, abandoned, which is a continuation of Ser. No. 152,069, Feb. 4, 1988, abandoned.

[51] Int. Cl.$^6$ .................................................. G11B 15/18
[52] U.S. Cl. .............................................. 360/69; 360/70
[58] Field of Search .................... 360/69, 70, 71, 360/74.1, 75, 77.02, 77.04, 77.05, 77.06, 78.04, 78.06, 78.07, 78.08, 78.14

[56] References Cited

U.S. PATENT DOCUMENTS

| | | | |
|---|---|---|---|
| 4,103,314 | 7/1978 | Case | 360/78.06 |
| 4,717,968 | 1/1988 | Painton et al. | 358/310 |
| 4,737,867 | 4/1988 | Ishikawa et al. | 360/69 |
| 4,979,056 | 12/1990 | Squires et al. | 360/69 |

FOREIGN PATENT DOCUMENTS 0134357  10/1981  Japan ................................ 360/99.01

Primary Examiner—Andrew L. Sniezek
Attorney, Agent, or Firm—Fliesler, Dubb, Meyer & Lovejoy

[57] ABSTRACT

A hard disk drive system operates from a limited power source to provide for the storage of data on the surface of a rotating hard disk media. An embedded controller incorporates a data channel for transferring data with respect to a hard disk media. The controller includes first and second subsections and a power-down circuit for providing separately switchable power from the power source to the first and section subsections. The controller further includes a processor for controlling the power-down circuit. The processor nominally provides a low duty cycle control signal to the power-down circuit for switching the provision of power to the first subsection of the controller.

7 Claims, 6 Drawing Sheets

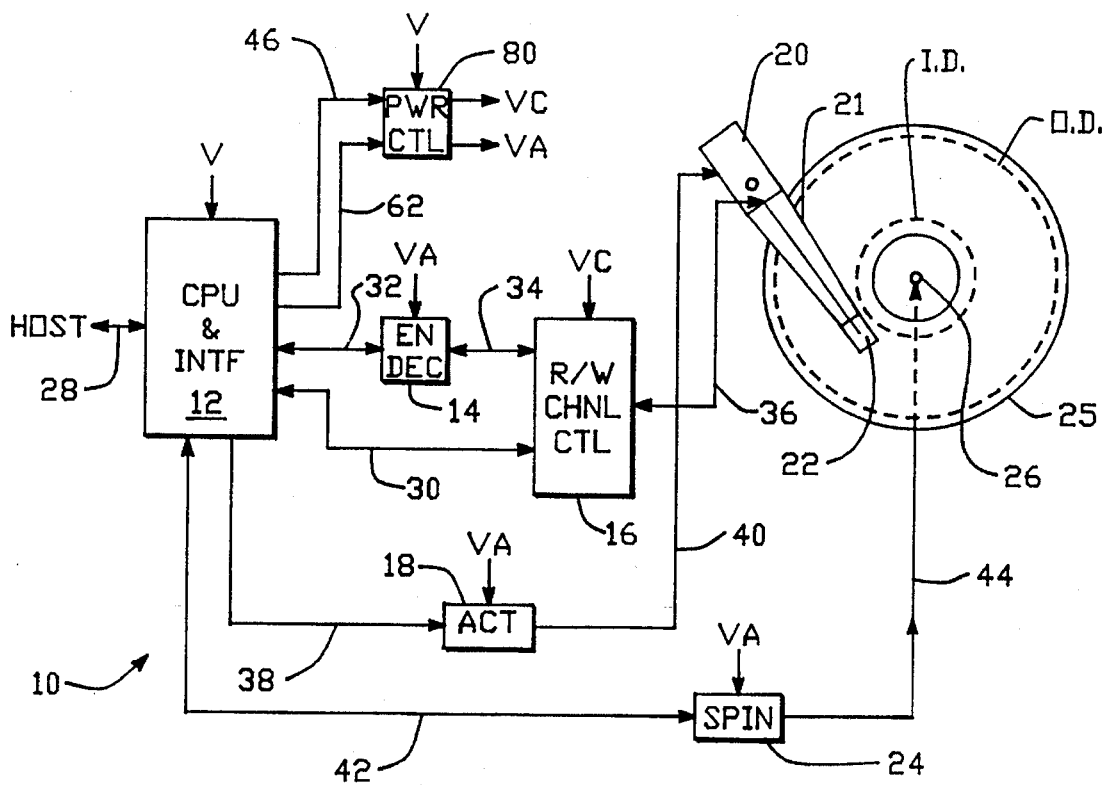
FIG. 1
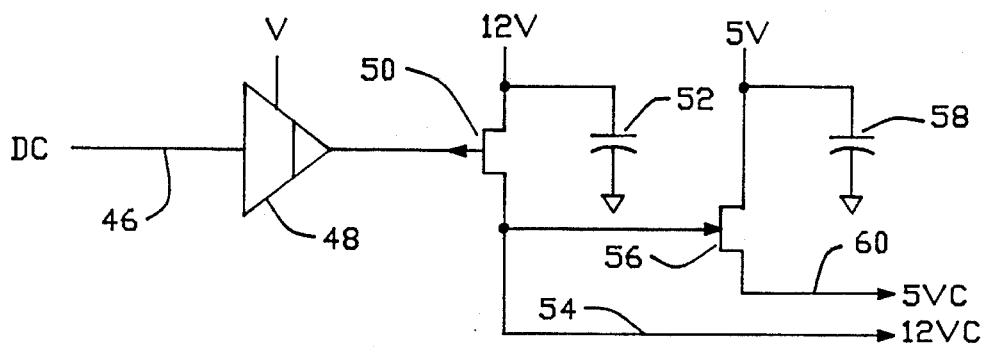
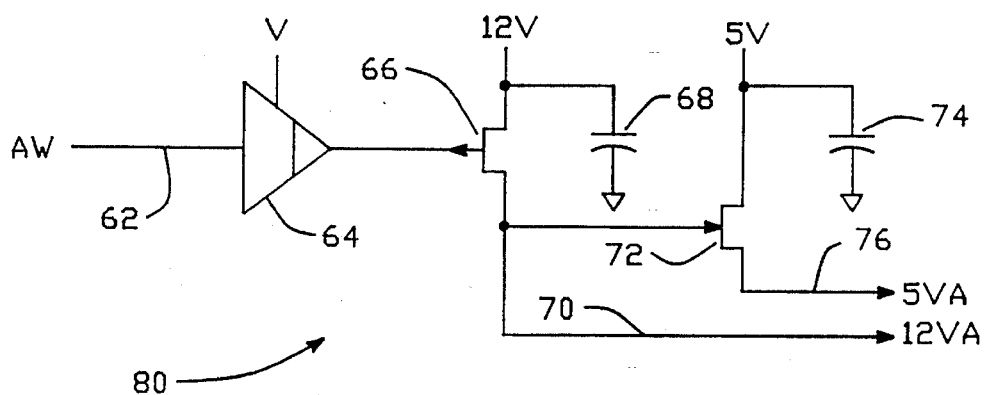
FIG.-3

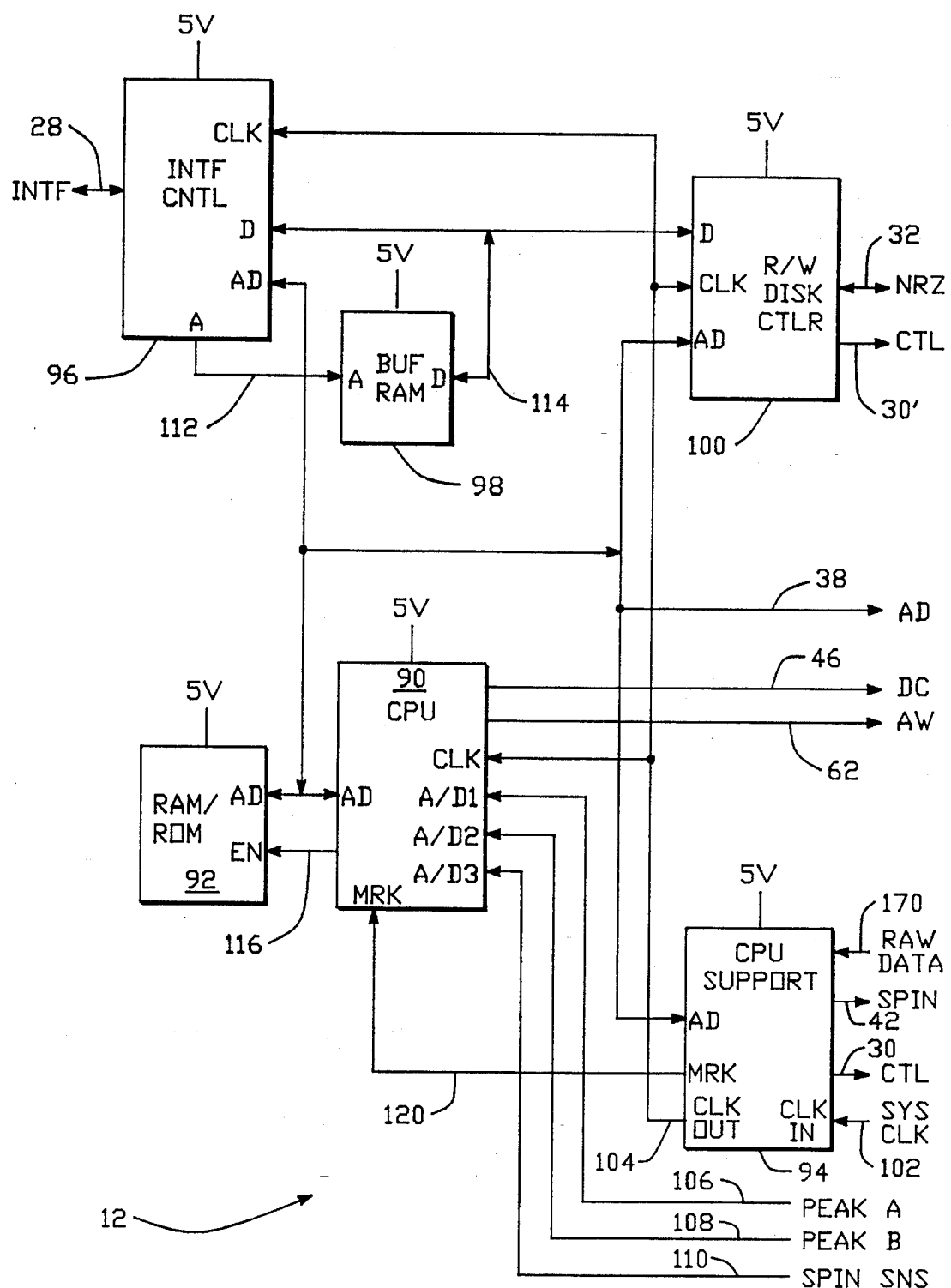
FIG.—4

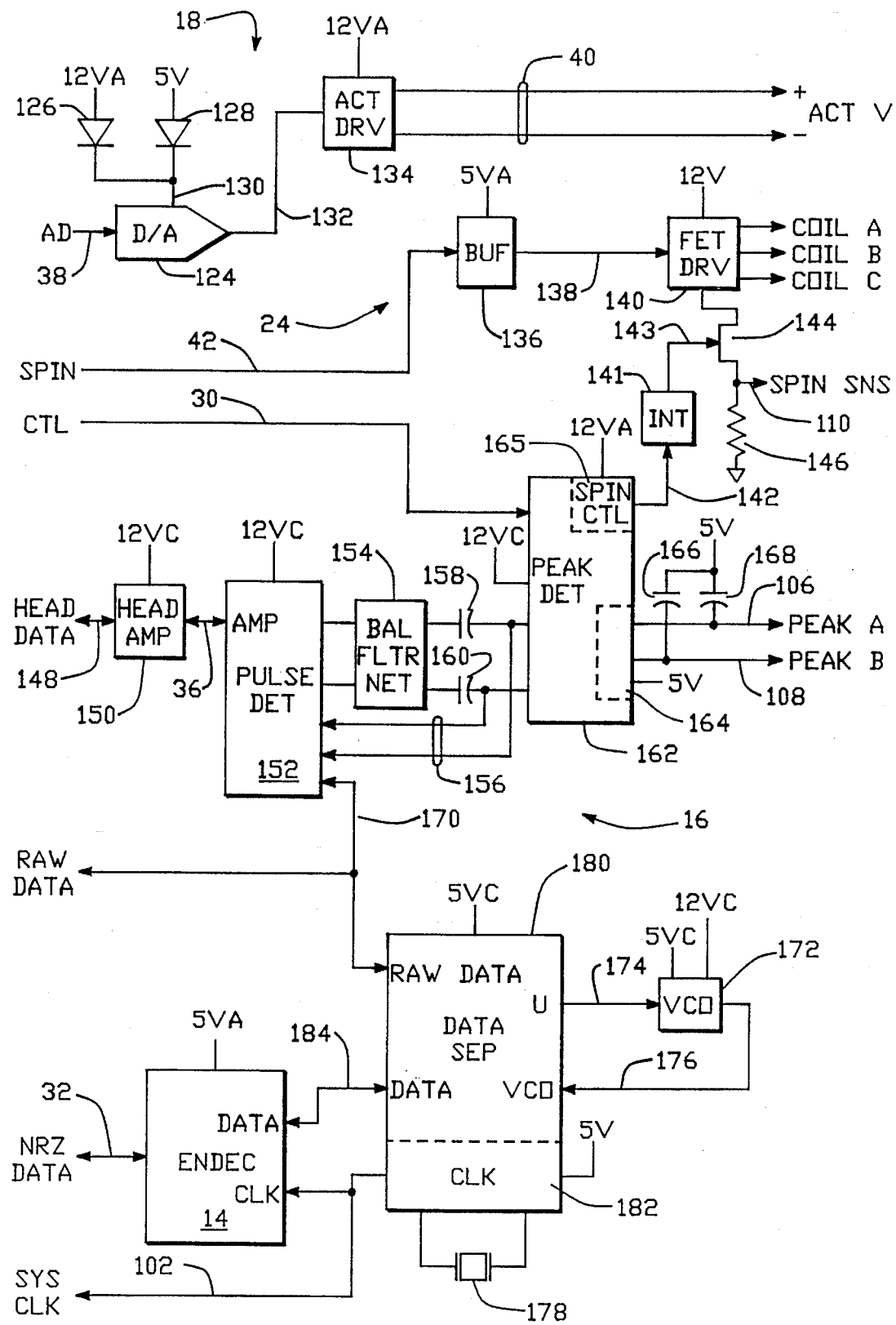
FIG.—5

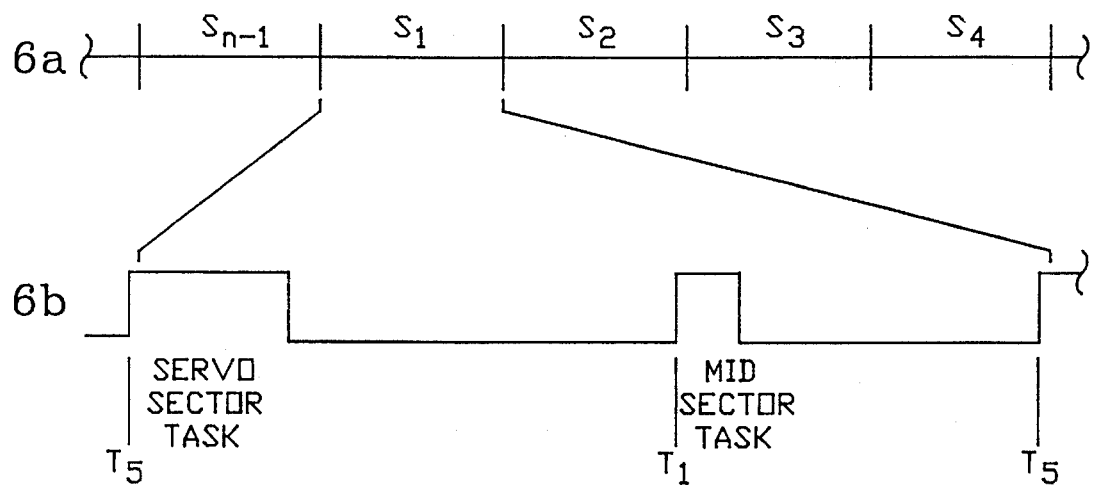
FIG.—6
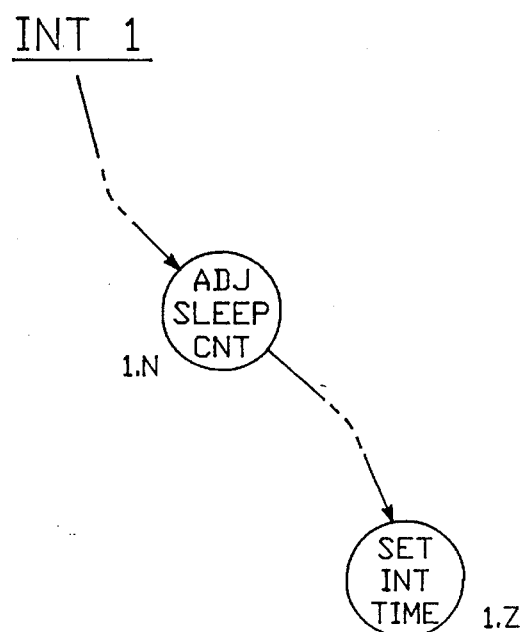
FIG.—7

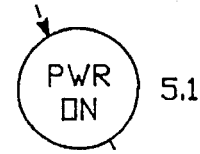
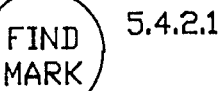
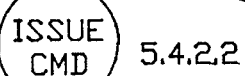
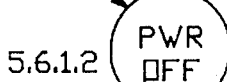
FIG.-8

LOW-POWER HARD DISK DRIVE SYSTEM ARCHITECTURE

This application is a divisional of application Ser. No. 08/123,582, filed Sep. 17, 1993, U.S. Pat. No. 5,402,200 which is a continuation of application Ser. No. 07/564,693, filed Aug. 7,1990, now abandoned which is a continuation of application Ser. No. 07/152,069, filed Feb. 4, 1988, now abandoned.

CROSS-REFERENCE TO RELATED APPLICATIONS

The present application is related to the following applications, all assigned to the assignee of the present application:

1. Disk Drive System Controller Architecture, J. P. Squires et al, U.S. application Ser. No. 057,289, filed Jun. 2, 1987, now U.S. Pat. No. 4,979,056, issued Dec. 18, 1990.

2. Disk Drive Software System Architecture, J. P. Squires et al, U.S. application Ser. No. 08/062,737, filed May 14, 1993, which is a continuation of application Ser. No. 07/790,008, filed Nov. 4, 1991, now abandoned, which is a continuation of application Ser. No. 07/488,386, filed Feb. 23, 1990, now abandoned, which is a continuation of application Ser. No. 057,806, filed Jun. 2, 1987.

3. Low-Height Disk Drive, F. M. Stefansky, U.S. application Ser. No. 07/147,804, filed Jan. 25, 1988, now U.S. Pat. No. 4,965,684, issued Oct. 23, 1990.

FIELD OF THE INVENTION

The present invention is generally related to low-power and power efficient hard disk drive systems and, in particular, to a hard disk drive and drive controller architecture that implements multi-level power staging of the controller subcomponents to minimize, in real time, the power requirements of the drive and controller while maintaining the drive in corresponding stages of readiness for anticipated operation.

BACKGROUND OF THE INVENTION

While there is a general and continuing desire to provide for ever increasing data storage capacities by individual hard disk drive systems, other general desires include the reduction of power consumption and the concomitant requirement for adequate heat dissipation capacity. The reasons for desiring reduced power consumption differ depending on specific market forces. In computer systems employing very high performance hard disk drives, the issues involve not only the physical size, cost and support of high-capacity power supply subsystems, but also the mechanical and electrical consequences of large thermogradients within the disk drive arising from high levels of internal power dissipation.

At the other extreme, small computer systems typified by the so-called "portable" and "lap top" personal computers require hard disk drive systems operation from limited capacity power supplies, such as batteries, and very limited allowable power dissipation due to the high-packing density of components within the computer and limited effectiveness, if not ineffectiveness of air cooling by a heat dissipation fan.

There are a number of approaches that can be taken to reduce power consumption by a hard disk drive without compromise of its otherwise achievable operating performance. A simple approach is to power-down the hard disk drive whenever immediate access to the stored data is unnecessary. The benefit of this approach is, of course, that power consumption is reduced to zero for a substantial portion of the time that the remainder of the computer system is operating. Conversely, a significant if not substantial delay is incurred whenever data access is required. Further, power consumption during each power-up of the hard disk drive may exceed the power savings when sufficiently frequent hard disk drive accesses are required.

Another approach is to carefully manage the design and implementation of each of the drive subsystems to obtain a hard disk drive optimized for power consumption. For example, the use of a full step-per-track stepper motor in the implementation of the read/write head positioner subsystem will permit simple open-loop controlled track following without the consumption of power. Similarly, the use of a low-torque spin motor will typically obtain a higher energy efficiency for steady state operation, though incur a longer spin-up delay and limit both the disk mass spun and the maximum acceptable level of read/write head to disk surface friction.

Another possibility for optimization includes the combined use of custom integration CMOS logic circuitry wherever possible. The object is to efficiently provide the required controller logic, including analog functionality, in as few chip packages as possible. The trade off is, of course, cost; cost being a substantial, if not controlling factor to commercial success. Further, the use of custom integrated circuits, due to greatly increased development lead time complexity, may actually result in the realization of limited control capability and thereby compromise or restrict the overall functionally of the hard disk drive system. Additionally, there is an inherent limit on the degree of power savings that can be achieved through the use of very high levels of integration.

SUMMARY OF THE INVENTION

Therefore, a general purpose of the present invention is to permit the realization of a high-performance, low-power hard disk drive system.

This is achieved in the present invention by providing a hard disk drive system, operating from an external power source, to provide for the storage, of data on a surface of a rotating hard disk media. The control system of the present invention provides for a data channel for transferring data with respect to the hard disk media. The data channel includes first and second subsections and a power circuit for providing separately switchable power from the external power source to the first and second subsections. The control system further includes a controller for controlling the power-down circuit. The controller includes a timing circuit for providing a duty cycle control signal to the power-down circuit for switching the provision of power to the first subsection of the data channel.

An advantage of the present invention is that it provides for the selective powering of only those components of the hard disk drive system that are required to be operational at any specific point in time. In an embedded servo system, a major portion of the data channel, at least from a power consumption point of view, need be powered only for a very low percentage of each sector period without otherwise affecting the performance of the hard disk drive system.

Another advantage of the present invention is that it permits implementation of a multi-stage reduction in power consumption. Different staged modes may be selected depending on the immediacy that full read/write operation of the hard disk drive system is required and the desired average power consumption level of the hard disk drive system over time. The second subsection of the data channel may be powered-down, including a spin-down of the hard disk media, whenever a long term delay between required data accesses of the hard disk is anticipated. This "spin sleep" mode may be automatically instigated and recovered from by the present invention, or may be selected in response to a command issued by an external host computer system. In recovering from the "spin-sleep" mode, there is a hard disk spin-up delay, but the performance of the hard disk system remains otherwise unimpaired.

A further advantage of the present invention is that the multiple staged power reduction modes of the present invention may be supported readily in the operation of a real time, intelligent controller system. Power-down stage selection, maintenance, and recovery require minimal support overhead in the operation of the real time controller.

BRIEF DESCRIPTION OF THE DRAWINGS

These and other attendant advantages and features of the present invention will become readily apparent upon consideration of the following detailed description of the present invention when considered in conjunction with the drawings, wherein like reference numerals used throughout the figures thereof designate like parts, and wherein:

FIG. 1 is a simplified block diagram of a hard disk drive system constructed in accordance with a preferred embodiment of the present invention;

FIGS. 2a–c present a diagrammatic explosion of the format and constituency of a track sector formatted in accordance with a preferred embodiment of the present invention;

FIG. 3 is a simplified schematic of a power-down control circuit constructed in accordance with a preferred embodiment of the present invention;

FIG. 4 is a simplified block diagram of a portion of the control architecture of a preferred embodiment of the present invention;

FIG. 5 is a simplified block diagram of the remainder of the control architecture of a preferred embodiment of the present invention;

FIG. 6 presents a diagrammatic explosion of a track sector and relatively timed execution of two background tasks utilized in support of the idle and sleep modes of a preferred embodiment of the present invention;

FIG. 7 is a simplified software state diagram illustrating the process control flow of a mid-sector background task of a preferred embodiment of the present invention; and FIG. 8 is a software state diagram illustrating the process control flow of a servo sector background task of a preferred embodiment of the present invention.

DETAILED DESCRIPTION OF THE INVENTION

I. Controller Architecture Overview

Figure 2:
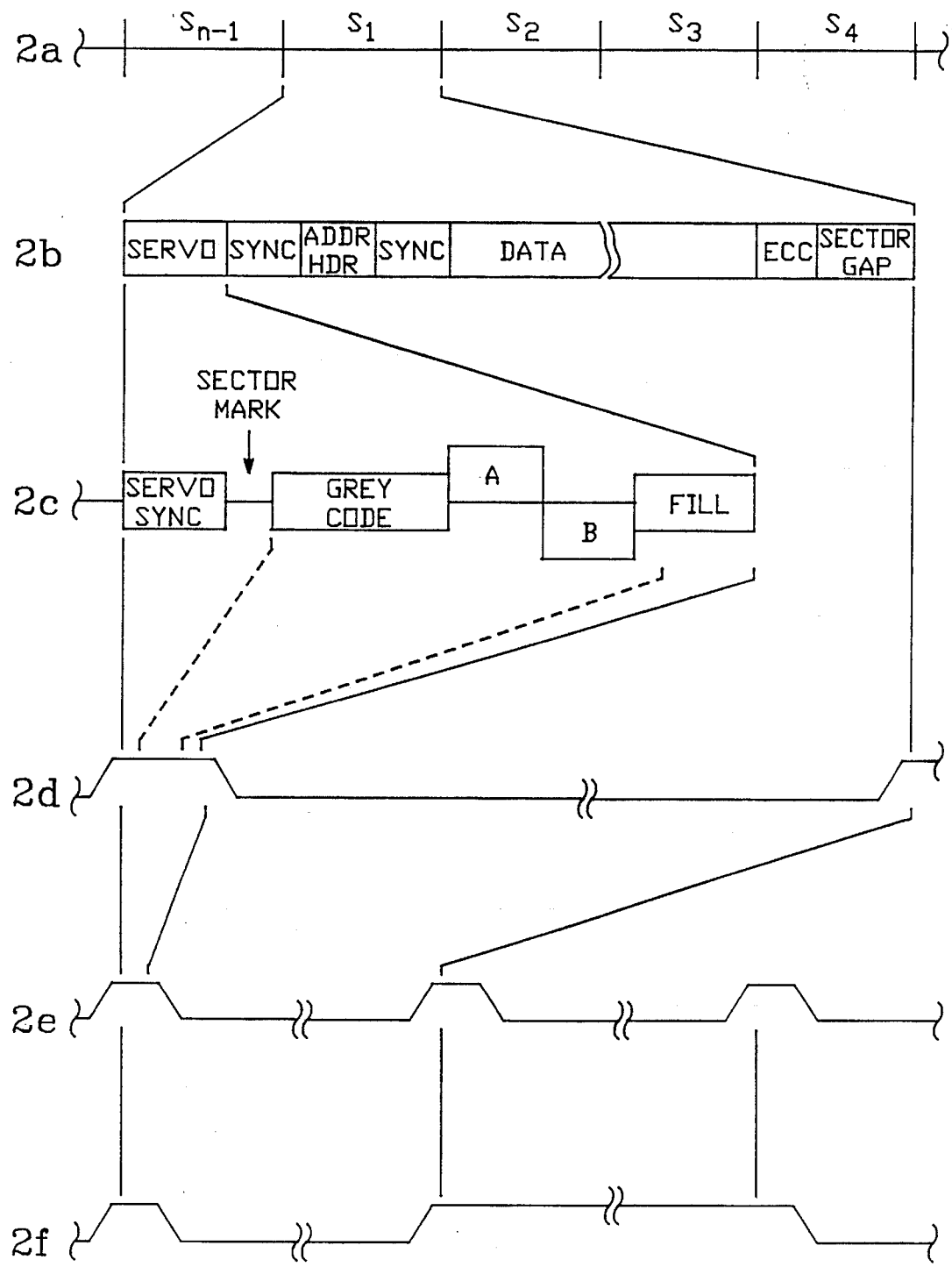
FIG. 2 presents a diagrammatic explosion of the duty cycle modes and read/write section of operation of the present invention.

A hard disk drive system architecture, generally indicated the reference numeral 10, is shown in FIG. 1. The architecture includes a CPU block 12, a data encoder/decoder (ENDEC) 14, and a read/write channel controller 16 as the primary controller electronics. An actuator controller 18, operating in response to a digital position value provided by the CPU block 12 on the data lines 38, provides a control voltage on its output line 40 to the winding terminals of a voice coil motor (not shown) to control the position of an actuator assembly 20. The actuator assembly 20 also includes an actuator arm 21 supporting a read/write head 22. The actuator assembly 20 is pivotable to allow the read/write head 22 to be swept through an arc extending across the data track band on the surface of a hard disk media 25. The data track band is defined as a band of concentric data tracks lying between the inside (I.D.) and outside (O.D.) track band diameters as indicated by the dashed lines in FIG. 1.

The hard disk media 25 is spun by a spin motor generally indicated the reference numeral 26. The spin motor is preferably a brushless, six-phase DC motor. A spin motor driver 24 provides an appropriate six-phase drive current to the stator windings of the spin motor 26 via lines 44. The spin driver 24, in turn, is controlled by the CPU block 12 via phase select control signals provided on control lines 42.

A data channel, including the ENDEC 14 and read/write channel controller 16, provides for data communication between the CPU block 12 and ultimately the hard disk media 25. A bidirectional serial data path extends successively from the CPU block 12 to the ENDEC 14 via data line 32, to the read/write channel controller 60 via data line 34, and finally to the read/write head 22 via data line 36. Control signals are passed between the CPU and 12 and the read/write channel controller 16 via the control lines 30 for their mutual coordination of the serial data transfer.

Finally, a power controller 80 is provided to selectably route power to at least two subsections of the controller architecture. In general, the first subsection includes the ENDEC 14, actuator controller 18 and spin driver 24. The read/write channel controller 16 constitutes, in general, the second subsection of the controller architecture. The power controller 80 provides power to the first subsection from a VA power supply line while the second subsection receives power from a VC power supply line. The power controller 80 itself operates from an externally switched power source V. In response to control signals provided by the CPU block 12 via control lines 46, 62 the power controller 80 transfers power to the VC or VA power lines or both. Consequently, the first and second subsections of the controller architecture 10 may be separately enabled through the provision of power.

II. Low Power Mode Operation Overview

The preferred embodiments of the present invention utilize a data track format conventionally known as embedded servo. That is, as shown in FIG. 2a, the concentric data tracks of the track band is divided into a typically fixed number of data sectors. Each data sector, in turn, contains a servo field and a primary data field, as well as a number of other fields as shown in FIG. 2b. The servo field occurs typically at the beginning of its sector and typically occupies less than about ten percent of the sector's linear, or more accurately, rotational arc length. The servo field serves to carry track and centerline relative positioning information in the fields shown in FIG. 2c. This track information is used as feedback in a closed-loop servo controlled process as necessary for actuator track following by the read/write head 22 with respect to a specific track. The servo information is also used in seeking operations where the read/write head 22 is moved to a new track.

A. Idle Mode

The idle mode of the present invention is characterized by the continuous provision of V and VA power and the switched provision of VC power only when data is to be actually transferred with respect to a data track on the hard disk media 25. Nominally, only the servo fields of the current data track are read to obtain the track identification and centerline position feedback information. Accordingly, the read/write channel controller 16 is switched into operation in response to the application of VC power by the CPU block 12 with a duty-cycle corresponding to and synchronized with the occurrence of sector servo fields under the read/write head 22 as the hard disk media 25 rotates. This results in a power consumption reduction equivalent to about ninety percent of the power required by the read/write channel controller 16.

When data is to be read or written to the primary data field of a sector, the CPU block 12 continues the provision of the VC power to the read/write channel controller 16 for the duration of the specific data sector for which the data transfer is required. That is, the idle mode duty-cycle switching off the VC power is suspended, in real-time, for only those data sectors where a primary data field read or write operation is required. Each primary data field read/write results in an increase in power over that required for nominal idle mode operation. However, the increase in average power consumption is directly proportional to the ratio of the actual number of primary data field data read/write operations and the total number of sectors that pass under the read/write head 22 during the same period.

Another variation in nominal idle mode power consumption occurs during track seek operations. In normal actuator track following operation, the CPU block 12 causes the actuator controller 18 to apply incremental changes to the voltage applied across the actuator voice coil winding in order to modify the position of the read/write head 22. Each such change results in an equally incremental and small current draw. However, in a seek operation, the current draw necessary to change the actuator position is sustained for the acceleration phase of the seek. Power consumption is therefore increased in proportion to the acceleration profile of the seek. Since all of the information required by the CPU block 12 for the proper performance of the seek is contained in the servo field of each sector, the idle mode duty-cycle switching of VC power to the read/write channel controller 16 is maintained throughout the duration of the seek operation.

B. Sleep Mode

The sleep mode of the present invention is entered when both the VC and VA power for the data channel 16, actuator controller 18 and spin driver 24 is switched and held off by the power controller 80. In the sleep mode, only the CPU block 12 remains operational. This mode of operation is preferably initiated by the CPU block 12 whenever a substantial delay is anticipated before the next hard disk media access is required. The delay may be anticipated by the CPU block 12 by the passage of a predetermined period of time without a read/write operation being requested. Alternately, the CPU block 12 may immediately invoke the sleep mode in response to a command received directly from the host. Upon invocation of the sleep mode, the hard disk media 25 is allowed to spin down and the actuator assembly 22 is parked. Sleep mode power consumption is therefore reduced to the level required to power only the CPU block 12.

C. Power-Off Mode

Finally, a power-off mode is effectively achieved by the removal of the external V power. All operation of the drive architecture 10 is suspended and power consumption is reduced to zero.

III. Power Controller

The power controller 80, as constructed in accordance with the present invention, is shown in FIG. 3. The power controller 80 includes two substantially identical power switch circuits for providing two separately switched 5 and 12 volt power levels. The first power switch receives the duty-cycle control signal (DC) from the CPU block 12 on the control line 46 at the input of a level shifter 48. The output of the level shifter 48 drives the gate terminal of a P-channel power MOS FET 50. The source of the power MOS FET 50 is coupled, in the preferred embodiments of the present invention, to an externally switched 12 volt potential supply and to a decoupling capacitor 52. The drain of the MOS FET 50 thus provides 12 VC power on a power controller output line 54.

The gate of a second N-channel power MOS FET 56 is connected to the 12 VC power line 54. By appropriate selection of the power MOS FETs 50, 56 as P- or N-channel devices, both will be either on or off depending on the state of the DC control signal. The drain of the power MOS FET 56 is coupled to an externally switched 5 volt potential supply and a decoupling capacitor 58. The source of the power MOS FET 56, therefore, provides 5 VC power on a power controller output line 60.

Similarly, a second level shifter 64, in response to an awake (AW) control signal provided by the CPU block 12 on control line 64, drives the gate of a P-channel power MOS FET 66 to switch power from the external 12 volt supply on to a 12 VA power controller output line 70. The gate of a second N-channel power MOS FET 72 is connected to the drain of the power MOS FET 66 to permit simultaneously switching of power from the external 5 volt supply to a 5 VA power controller output line 76. Decoupling capacitors 68 and 74 are connected between ground and the respective source and drain of the power MOS FETs 66, 72.

In accordance with the present invention, the decoupling capacitors 52, 58, 68, 74 are provided at the input or drain terminals of the power MOS FETs 50, 56, 66, 72 rather than connected to the VC and VA power lines 54, 60, 70, 76 in order to directly reduce the capacitance associated with the lines 54, 60, 70, 76. Capacitive loading would extend the rise and fall times associated with the switching of power on to the VC and VA power lines 54, 60, 70, 76. In accordance with the preferred embodiments of the present invention, VC power rise and fall times on the order of 10 to 30 microseconds have been found acceptable for proper operation of the controller architecture 10, while VA power rise and fall times may extend to several hundred microseconds.

IV. Data Track Format

Referring again to FIG. 2, the significant intrasector fields of a single representative sector are shown in FIG. 2b. As is typical of an embedded servo data sector format scheme, each sector includes, in order, a servo field, a first synchronization field, an address header field, a second synchronization field, a primary data field, and an error correction code (ECC) field. A sector gap spans the remaining distance to the beginning of the next successive sector.

An explosion of a representative servo field is provided in FIG. 2c. The servo field is composed of subfields including, in order, a servo synchronization field, a sector mark field, a grey code field, A and B servo burst fields, and a filler field. As illustrated, the sector mark field is represented as a period of zero data. The position of the sector mark field serves to provide timing information for locating the remaining subfields of the servo field. The grey code field is used to store a current track identification code, while the A and B burst fields provide track centerline positioning information by virtue of their physical symmetrical displacement from the current track's center line.

Referring now to FIG. 2d, idle mode operation of the present invention is illustrated. At a point in time ten to thirty microseconds before the anticipated beginning of the servo sync field of a sector, the read/write channel controller is powered in direct response to the provision of the DC control signal by the CPU block 12. With the prior continuing provision of V and VA power, the read/write channel controller 16 and the entire controller architecture 10 is therefore prepared to read and process the entire servo field of the current sector.

Where data is not to be transferred with respect to the primary data field of the sector, as determinable in advance by the CPU block 12, the DC control signal is withdrawn, as indicated in FIGS. 2d, shortly after the A and B burst fields are acquired by the read/write channel controller 16. Consequently, the DC control signal and corresponding switched provision of VC power nominally will have a ten to fifteen percent duty-cycle and a periodicity synchronized to the occurrence of sector servo fields as generally illustrated in FIG. 2e.

Where the CPU block 12 determines that data is to be transferred with respect to the primary data field of the current sector, the DC control signal is not withdrawn by the CPU block 12 for at least the duration of that sector. That is, VC power is maintained to the read/write channel controller 16 for the duration of the sector in order to process the remaining sector fields. FIG. 2f illustrates the continued powering of the read/write channel controller 16 as necessary to permit the reading or writing of the primary data field corresponding to the $S_2$ sector of FIG. 2a.

Since the sector gap field length is normally quite short in relationship to the total linear sector length, the DC control signal is maintained and VC power provided at least through the processing of the servo field of the next successive sector. Again, depending again on the real-time determination by the CPU block 12 with respect to the sector currently being processed, the DC control signal and, therefore, VC power may be withdrawn at the conclusion of the servo field processing as generally shown in FIG. 2f with respect to the $S_3$ sector of FIG. 2a.

V. CPU Block

A. CPU and CPU Support Circuit

In accordance with the present invention, the CPU block 12 is constructed entirely of high integration CMOS digital circuitry. Accordingly, the various subcomponents of the CPU block 12 may be powered continuously from the external V power source without significant power consumption. In the preferred embodiments of the present invention the average continuous power consumption for the total CPU block 12 is between approximately 0.1 to 0.5 watts and typically 0.30 watts.

FIG. 4 provides a block diagram of the CPU block 12 as constructed in accordance with a preferred embodiment of the present invention. Central to the CPU block 12 is a CPU 90. In the preferred embodiments of the present invention, the CPU 90 is a conventional Motorola MC68HC11A8 HCMOS single chip microcomputer. The CPU 92 includes an on-board interrupt controllers, a digital counter/timer subsystem, a parallel I/O interface and multiplexed input analog to digital converter. Each of these on-board controllers and subsystems are described in the MC68HC11A8 Motorola Semiconductor Technical Data Book, Ref. ADI1207, as published by Motorola, Incorporated, 1985.

The parallel I/O interface of the CPU 90 provides for the latched output of the duty-cycle and awake control signals on the control lines 46, 62 to the power controller 80. A RAM/ROM unit 92 is coupled to the CPU 90 by a multiplexed, system address and data base 38. The RAM/ROM unit 92 provides storage for the ROM control program executed by the CPU 90 as well as RAM data and scratch pad workspace for use during the execution of the control program. Selection of RAM/ROM unit 92 is performed by the CPU 90 by the provision of an enable signal on an enable control line 116.

Also coupled to the multiplexed, system address and data bus 38 is a CPU support circuit 94. The CPU support circuit 94 is a custom gate array circuit providing for a number of support functions specific to the operation of the CPU 90 within the controller architecture 10. The internal design and operation of the CPU support circuit is described in detail in Disk Drive System Controller Architecture, J. P. Squires et al, U.S. application Ser. No. 057,289, filed Jun. 2, 1987 and is expressly incorporated herein by reference. In general, the CPU support circuit 94 provides for the sequential generation of the multiphase spin motor control signals provided onto the spin control lines 42, a decoder circuit for decoding the grey code represented data track identification number from raw serial data received on a raw data input line 170, an index mark detector circuit also receiving the raw data on the raw data line 170, a system clock divider circuit for reducing the frequency of a system clock signal received on a clock input line 102 and providing the appropriate clock signals on the clock output lines 104 to the various subcomponents of the CPU block 12 and, finally, a latched parallel output interface for providing number of support control signals via the control lines 30 to the read/write channel controller 16. The control data latched by the parallel output interface of the CPU support circuit 94 is obtained from the CPU 90 via the multiplexed, system address and data bus 38. The data track identification number decoded by the grey code decoder of the CPU support circuit 94 can be read by the CPU 90 via the multiplexed, system address and data bus 38.

A sector mark detected control signal, as generated by the operation of the sector mark detector of the CPU support circuit 94, is provided on a digital input line 120 to the I/O interface of the CPU 90. Peak A and B analog voltage levels are received on two of the multiplexed input lines 106, 108 of the CPU's analog to digital converter subsystem. Another multiplexed input to the analog to digital converter of the CPU 90 receives an analog feedback voltage level (Spin SNS) from the spin motor driver 24.

B. Interface

The interface portion of the CPU block 12 includes an interface controller 96, buffer RAM 98 and a read/write disk controller 100. In the preferred embodiments of the present invention, the interface controller 96 maybe a conventional Adaptec AIC-500 interface controller, the RAM buffer 98 is a 8K byte by 8 bit CMOS static RAM, and the read/write disk controller 100 is an Adaptec AIC-11 disk controller. The interface controller 96 provides for protocol management and the transfer of commands, command responses and data with respect to a host computer system over an interface bus 28. The data either awaiting transfer out or upon receipt is stored in the buffer RAM 98. The interface controller 96 supports a dedicated address bus 112 for selecting data locations within the buffer RAM 98 for the transfer of data via a dedicated data bus 114.

The interface controller 96 also coordinates the transfer of data between the buffer RAM 98 and the read/write disk controller 100 via the dedicated data bus 114. The read/write disk controller 100 principally provides for the serialization and NRZ encoding of data transferred, via serial line 32, ultimately to the primary data fields of the hard disk media 25 and the NRZ decoding and parallelization of data received upon transfer back. The read/write disk controller 100 further provides control signals on control lines 30' to the read/write channel controller 16, including A and B burst gate and read/write enable signals.

Both the interface controller 96 and read/write disk controller 100 operate under the primary, high-level control of the CPU 90. For this purpose, both the interface controller 96 and read/write disk controller 100 are coupled to the multiplexed, system address and data bus 38 for the exchange of controller command and status information with the CPU 90.

VI. Data Channel

FIG. 5 provides a block diagram illustrating the details of the actuator controller 18, spin driver 24, the ENDEC 14 and read/write channel controller 16 as provided in a preferred embodiment of the present invention.

A. Actuator Controller

The actuator controller 18 includes a digital to analog (D/A) convertor 124 and an actuator driver 134. A digital actuator position correction value is provided by the CPU 90 to the convertor 124 via the multiplexed, system address and data bus 38 for conversion. The resulting analog position correction value is then provided on the convertor output line 132 to the actuator driver 134. The actuator driver 134 responds to analog position correction value by application of an input proportional high drive current through the windings of the actuator voice coil motor via lines 40.

Power four the D/A convertor 124 is nominally provided from the 12 VA power line 70 through a diode 126 to the convertor's power input line 130. There are several reasons for powering the D/A convertor 124 with VA power as opposed to VC power. Primary among these reasons is that, due to the use of a voice coil motor, power must be continually applied to maintain position.

A second reason for powering the D/A convertor 124 and the actuator drive circuit 134 from the VA power line 70, consistent with the first, is that seeking operations normally require continuous actuator voice coil current drive throughout the period of several if not many rotations of the hard disk media 25. Powering from the VC source is therefore inappropriate.

However, powering the actuator drive circuit 134 and D/A convertor 124 from a third switched power source, as an alternate embodiment of the present invention, would permit the application of power to the D/A convertor 124 and the actuator drive circuit 134 whenever full accuracy track following is desired and for the duration of seek operations. If actuator drift is tolerable for any period, then power from the third switched power source may be temporarily switched off, pending a need to return to full track following or performance of a seek operation.

In any case, however, power is not totally removed from the D/A convertor 124 even during sleep mode operation when the 12 VA power is withdrawn. Continuous 5 volt power is provided via diode 128 to the D/A convertor's power input line 130. Since the digital input bus of the D/A convertor 124 is directly connected to the multiplexed system address and data bus 38, complete removal of power to the convertor 124 would result in a loading of the address and data bus 38. This loading could cause degraded and possible erroneous operation of the various subcomponents of the CPU block 12 that may utilize the multiplexed, system address and data bus during sleep mode operation. The loading is precluded, in accordance with the present invention, by the continuous low-voltage, low power powering of the D/A convertor 124. Improper operation of the actuator due to the presence of an output voltage level on the convertor output line 132, in turn due to any possible improper low-power operation of the D/A convertor 124, is effectively blocked by the powering of the actuator driver 134 solely from 12 VA power. Thus, the actuator 20 is maintained completely inoperative during sleep mode operation.

B. Spin Driver

The spin driver 24 includes a buffer/invertor 136 and an FET driver 140. The buffer/invertor 136 serves to receive the spin control signals provided from the CPU support circuit 94 via spin control lines 42 and, in turn, provides the buffered signals on input control lines 138 of the FET driver 140. In response to the spin control signals, the FET driver 140 performs the necessary high current switching necessary to drive the three coil-terminal lines, Coil A, B, and C of the spin motor 26.

In accordance with the present invention, the buffer/invertor 136 is powered from the 5 VA power line 76 while the FET drive circuit is powered directly from 12 power. In order not to load the spin control lines 42 of the CPU support circuit 94, the CPU 90 is responsible for placing the spin control signals on the spin control lines 42 in an active low state immediately prior to instigation of the sleep mode. Since this combination of spin control signals has not caused improper commutation of the spin motor 26 by the FET drive circuit 140. Rather, this combination of spin control signals causes the FET drive circuit 140 to ground each of the spin motor coil lines and effectively brake the rotation of the spin motor 26. Concurrently, power consumption by the FET control circuit 140 is reduced to zero due to the open circuiting of all of the current paths from the unswitched 12 V power source. An FET current control bias, proportional to the desired current limit is provided on a bias line 142.

An FET 144 is provided as a current control element in the current, path of the FET drive circuit 140 power return and ground. The FET 144, in response to a bias potential or its gate control line 143, regulates the level of commutation drive current provided through the spin motor 26. The bias potential on gate control line 143 is obtained from a resistor/capacitor integrator circuit 144 utilized to convert a digital spin commutation duty cycle signal ultimately provided from the CPU block 12.

In accordance with the preferred embodiments of the present invention, a resistor 146 is also placed in the current return path to ground of the FET driver 140. The placement of the resistor 146 permits generation of a Spin SNS voltage level on the Spin SNS line 110. The Spin SNS analog voltage level is used as spin motor speed feedback voltage value by the CPU 90 during spin-up of the spin motor 26. Both the generation of the FET 144 gate bias and use of the spin SNS analog voltage level are shown and described in Method and Apparatus for Brushless DC Motor Speed Control, J. P. Squires et al, U.S. application Ser. No. 880, 754, filed Jul. 1, 1986, which is expressly incorporated by reference herein.

VII. Principle Data Channel Electronics

The data path through the ENDEC 14 and read/write channel controller 16 is entirely bidirectional. Beginning at the surface of the hard disk media 26, data acquired by the read/write head 22 is provided via a data line 148 to a conventional hard disk read/write head data preamplifier 150. Amplified data is then provided to a pulse detector 152 via the serial data line 36. The pulse detector may be a conventional pulse detector such as the NS8464 pulse detector, manufactured and distributed by National Semiconductor Corporation, 2900 Semiconductor Drive, Santa Clara, Calif. 90501, and described in its Advanced Peripheral Processor Solution Handbook Number 1: Mass Storage, published by National Semiconductor, 1986. The amplified data received by the pulse detector 152 is passed through a balanced filter network 154 for waveform shaping and then returned to the pulse detector 152 via lines 156. With the exception of the DC blocking capacitors 158, 160, the design of the balanced network is consistent with the analog waveform shaping circuit design recommended for use by the pulse detector manufacturer. The capacitors 158, 160, as provided in accordance with the present invention and typically having a value of 0.001 microfarads, are provided to block DC bias, if any, in the analog waveform received from the head preamplifier. A further description discussion of the DC bias blocking by the capacitors 158, 160 is provided in Disk Drive System Controller Architecture, J. P. Squires et al, U.S. application Ser. No. 057,289, filed Jun. 2, 1987, which is expressly incorporated by reference herein.

The DC blocked, waveform shaped analog data signals are also provided to a peak detector 162. A primary function of the peak detector 162 is to acquire A and B burst analog values representing the A and B subfields of each sector's servo field. The relative peak magnitudes of the A and B analog voltages provides information directly corresponding to the position of the read/write head 22 with respect to the center line of the current data track. The peak detector 162 employs an analog differentiator and a pair of sample and hold circuits to obtain the A and B burst values. These internal circuits are essentially identical to their discrete counterparts as described in Disk Drive System Controller Architecture, J. P. Squires et al, U.S. application Ser. No. 057,289, filed Jun. 2, 1987.

The peak detector 162 also the receives A and B burst gate enable signals via control lines 30 (lines 30' in FIG. 4) for enabling the operation of the respective internal A and B burst sample and hold circuits. The A and B burst gate enable signals are generated by the CPU support circuit 94 at a timed interval after detection of the sector mark of the current servo field. The sample and hold circuits provide for the capture of the analog voltage values representing the A and B bursts on capacitors 166, 168, respectively. The capacitors 166, 168 are connected between the continuous 5 V power line and the respective peak A and B analog signal lines 106, 108.

The peak detector 162 is primarily provided power from the 12 VC power line 54. Although the peak A and B analog values maintained by the capacitors 166, 168 may not be sensed and converted to digital values by the CPU 90 until after VC power is withdrawn, the internal sample and hold circuits are constructed to present a high impedance value to the peak A and B lines 106, 108 when unpowered. That is, a conventional NPN buffer circuit 164, separately powered directly from the unswitched 5V supply, guarantees that the peak detection 162, when not powered from the 12 VC power source, does not load the Peak A and B lines 106, 108.

Conversely, the peak detector 152 is allowed to load the capacitors 158, 160 upon withdrawal of VC power, a DC shift of the shaped waveforms will therefore be induced. In accordance with the present invention, the capacitive value of the capacitors 158, 160 are selected to be quite small; about 0.001 microfarad each. Consequently, the 10 to 30 microsecond VC power ramp-up prior to the beginning of the sector servo field is sufficient to allow an adequate degree of settling in the mutual operation of the balance network 154 and capacitors 158, 160. Consequently, the present invention maintains the minimum circuitry necessary powered from the 12 VA power line 70, yet permits proper operation of the read/write data channel 16 throughout the duty cycling of the VC power.

Finally, a spin control signal buffer 165 is provided within the peak detector 162. The buffer 165 is placed within the peak detector 162 in the preferred embodiments of the present invention for convenience of integration and reduction of the number of separate components. In accordance with the present invention, the latch 165 is provided with power from the 12 VA power line so as to maintain its output independent of the duty cycle switching of the VC power. As generally indicated above, a duty cycle switched control signal provided on one of the control lines 30 is buffered and then output onto a control line 142. This duty cycle signal is then integrated by the integrator 141 to establish a bias level on line 143 that is proportional to the duty cycle of signal on line 142. The rotational speed of the spin motor 26 is therefore dependant on the duty cycle of the duty cycle switched control signal powering the spin control buffer separately from the VC power supply is necessary to permit independence between the VC power supply duty cycles and the rotational speed of the spin motor 26.

Raw data, as processed by the pulse detector 152, is provided on the raw data line 170 to a data separator 180. The function of the data separator 180 is conventional in that it uses an analog phase lock loop for the separation of serial data and a data clock signal from the raw data. The analog phase lock loop of the data separator 180 utilizes a VCO 172 to convert a data clock signal error voltage, as provided by the data separator 180 on a VCO input line 174, to a corresponding oscillator frequency on a VCO output line 176.

The majority of the data separator 180 operates from 5 VC power as provided from the VC power line 60. The exception is that the clock generator subsection 182 of the data separator is provided with continuous 5 volt power. The clock generator subsection 182 operates from a crystal controller oscillator 178 to generate the system clock on system clock output line 102. Since the system clock is utilized throughout the CPU block 12, the system clock signal must be provided at all times. Therefore, consistent with the present invention, the clock generator 182 of the data separator 180 operates from a separate, continuous 5 volt power input.

The VCO 172 operates from a combination of 5 VC and 12 VC power from the VC power lines 60, 54.

Finally, the ENDEC 14 provides for the code conversion of NRZ data transferred between the ENDEC 14 and read/write disk controller 100, via serial data line 32, and a 2,7 RLL encoded format, including the data clock signal, transferred between the ENDEC 14 and the data separator 180. In the preferred embodiments of the present invention, the ENDEC 14 is an Adaptec AIC-270 2,7 RLL encoder/decoder.

VIII. Idle and Sleep Mode Control Processes

In accordance with the preferred embodiments of the present invention, the CPU 90 operates as a real-time, event driven processor responding to the occurrence of timed interrupts internally generated by the coordinated operation of the timer and interrupt controller subunits of the CPU 90. A foreground task is nominally executed by the CPU 90 primarily to manage the service of host originated requests for the transfer of data. A number of background tasks, initiated by the occurrence of timed interrupts, are utilized to implement various disk-drive control functions, including actuator position control, disk rotational speed control and the execution of disk read/write operations. A description of these tasks, and their cooperative operation is provided in the above cited Disk Drive Software System Architecture.

In brief, the interface controller 96 manages a data block in the buffer Ram 98. The CPU 90 is permitted access to this data block via the interface controller 96. Predefined fields in the data block establish the identify and current status of any request pending with the interface controller 96 and store the information necessary to carry out the request. Based on the identity of the request and supporting information, the CPU 90 manages a number of state variables within its own address space to establish the functions to be carried out by the background tasks. These functions may include the performance of an actuator seek operation or a primary data read/write operation on an identified sector of the current data track. In executing the foreground task, the CPU 90 periodically polls the status fields of the interface controller's data block. When an actionable request is recognized, the CPU 90 initializes, or primes, the state variables to effectively initiate the background tasks necessary for the CPU 90 to carry out the request.

Within the framework of the execution of the foreground and background tasks, the present invention provides for the real-time management of the idle and sleep modes of the present invention. As indicated in FIG. 6, two background tasks of significance to the present invention, identified as servo-sector and mid-sector tasks, occur during the period of each sector. The servo-sector background task, as indicated in FIG. 6*b*, is initiated by the occurrence of a T5 interrupt generated by the timeout of an arbitrarily selected timer channel five approximately 10 to 30 microseconds before the expected passage of a servo field passing under the read/write head 22. The servo-sector task executes to acquire the sector mark and the A and B bursts. The execution of the foreground task is then resumed at the point where it was interrupted by the T5 interrupt.

The mid-sector background task, as indicated in FIG. 6*b*, is initiated by the occurrence of a T1 interrupt generated by the timeout of an arbitrarily selected timer channel one. The T1 timeout period is set, in the preferred embodiment of the present invention, during the servo sector task to occur a fixed period after detection of the sector mark of the current sector. The only functions that occur during the mid-sector task pertinent to the present invention, as generally shown in FIG. 7, are the adjustment of a sleep count value, during a T1 State 1.N, and the setting of the timeout period for the next T5 interrupt in T1 State 1.Z prior to the execution of the return from interrupt instruction of the mid-sector task. In the preferred embodiments of the present invention, the sleep count value is held in a two byte memory variable that is decremented in State 1.N if not already zero.

A. Idle Mode Control Process

In accordance with the preferred embodiments of the present invention, the period of the T5 interrupt timer is adjusted by the CPU 90 during each mid-sector State 1.Z to nominally timeout, and thereby trigger a T5 interrupt, between 10 and 30 microseconds prior to the beginning of a servo field passing under the read/write head 22. In parallel, a non-interrupting timer channel three is used in the preferred embodiments of the present invention to provide the DC control signal to the power controller 80 between 30 and 50 microseconds prior to the beginning of the servo field. This delay from the issuance of the DC control signal to the occurrence of the T5 interrupt permits the operation of the VC powered components to stabilize.

As diagrammatically shown in FIG. 8, the non-interrupting time out of the channel three timer invokes a virtual, or non-executed power-on State 5.1. In this state, the DC control signal is asserted on control line 46 to the power controller 80 to restore VC power to the read/write-channel controller 16. The CPU 90 subsequently responds to receipt of the T5 interrupt by entering a State 5.2 to prepare for expected occurrence of the sector mark.

Next, a decision State 5.3 is entered by the CPU 90. Here, the CPU 90 determines from a read/write state variable whether a read/write operation was primed by the foreground task for execution with respect to the current sector. In the preferred embodiments of the present invention, the execution of a read/write operation is initiated in the sector servo background task by the issuance of a corresponding command by the CPU 90 to the read/write disk controller 100. Preferably, the issuance of the command should be immediately after the detection of the sector mark. Implementation of largely parallel State branches 5.X.1 and 5.X.2 for States 5.4.X through 5.6.X permit a single decision to be made in decision State 5.3, rather than in-line after the detection of a sector mark. Accordingly, the CPU 90 transits to a State 5.4.1 if a read/write operation is not to be performed with respect to the current sector or to a State 5.4.2.1 if a read/write operation is to be performed.

The operative states processed by the CPU 90 in parallel State branches 5.X.1 and 5.X.2 for States 5.4.X through 5.6.X are largely identical. The CPU 90 initially enters a respective find mark State 5.4.1 or 5.4.2.1. In these states, the CPU 90 enables the CPU support circuit 94 to detect the occurrence of a sector mark, if at all, within a sector mark search window timed by the CPU 90. If the sector mark is not detected within the allowable window, a transition is made to a mark error State 5.8 for recovery of synchronization between the T5 interrupt and the rotational occurrence of sectors with respect to the read/write head 22.

On detection of the sector mark in State 5.4.2.1, the CPU 90 enters State 5.4.2.2 and issues the read/write controller command.

The CPU 90 next enters a respective spin commutation State 5.5.1 or 5.5.2. These states are utilized by the CPU 90 to change, as appropriate, the spin control signals provided by the CPU support circuit 94 to the spin controller 24 via control lines 42. The CPU 90 then transits to a respective A/B burst State 5.6.1.1 or 5.6.2. In these states, the CPU 90 enables the acquisition of the A and B burst values.

Uniquely from State 5.6.1.1, the CPU 90 next enters an idle mode power-off State 5.6.1.2. In this state, the CPU 90 withdraws the DC control signal provided on line 46 to the power controller 80 and, consequently, the read/write channel controller 60 is powered off. In accordance with the present invention, the DC control signal is not withdrawn if a read/write controller command was issued with respect to the current sector. Rather VC power is left on through the next execution of the 5.X.1 branch State 5.6.1.2.

Finally, the CPU 90 transits from the idle mode power-off State 5.6.1.2 or the A/B burst State 5.6.2 to a last State 5.7. This state is utilized by the CPU 90 to set the T1 interrupt period and the time out period for the channel three timer. The T5 interrupt period is subsequently set by the mid-sector background task after adjustment based on the sector mark's actual time of occurrence relative to the sector mark detection window boundaries. The CPU 90 then executes a return from interrupt instruction (RTI) and resumes the foreground task.

B. Sleep Mode Control Process

In accordance with the present invention, the sleep mode process is largely handled by the foreground task. Once any pending request has been satisfied and no further request found pending by polling the status fields of the interface controller's data block, the CPU 90 initializes the two byte sleep counter variable to a default count value. This default count value, present as a two byte variable in the address space of the CPU 90, is initialized by the CPU 90 following application of the externally switched 5 V power to the controller architecture 10. At the same time, the AW control signal is provided to the power controller 80 to enable the transfer of VA power.

In the preferred embodiments of the present invention, the sleep count variable is decremented once per revolution of the hard disk media 25 when an arbitrarily selected sector passes under the read/write head 22. The default count value for a desired timed delay until a zero count value is therefore directly dependant on the rotational period of the hard disk media 25. In the preferred embodiments of the present invention, the maximum delay period is approximately 18.2 minutes.

For purposes of the present invention, a period of request inactivity corresponding to the default counter value is treated as a determinant criteria for invoking the sleep mode of operation. The assumption is that the absence of a data read/write request means that the imminent receipt of such a request is sufficiently unlikely that the sleep mode of operation should be invoked. Therefore, the CPU 90, in execution of the foreground task, responds to a zero sleep count variable value by withdrawing the AW power control signal from the power controller 80.

IX. Summary

Thus, a hard disk drive architecture capable of operating from a limited power source and that further utilizes a multi-staged power reduction technique for reducing power consumption. In a first stage, in real time synchronization with the occurrence of sector servo fields, power is cycled to a portion of the hard disk drive architecture. In a second stage, power is withdrawn from all components of the hard disk drive architecture except for the CPU and interface block so as to reduce power consumption to an extreme minimum.

Clearly, many modifications in variations of the present invention are possible in light of the above teachings. Therefore, it is to be understood that within the scope of the appended claims, the principles of the present invention may be realized in embodiments other than as specifically described herein.

We claim:

1. A hard disk drive system, responsive requests issued by a host computer, for the storage and retrieval of data, said disk-drive system comprising:
    a) data means for storing data including a rotating media, wherein the data is stored at a surface of said rotating media and wherein the data includes control information fields distributed over said surface in a predetermined pattern; and
    b) control means for controlling said data means, said control means including first means for communicating with the host computer, second means for transferring data to and from said data means, third means for selectably providing power to second means, and fourth means for selecting said third means to provide power to said second means immediately prior to the rotational passage of a predetermined control information field by a predetermined point.

2. A hard disk drive system responsive to requests issued by a host for the storage and retrieval of data, said disk-drive system comprising:
    a) data means for storing data including a rotating media, wherein the data is stored at a surface of said rotating media and wherein the data includes control information fields distributed over said surface in a predetermined pattern; and
    b) control means for controlling the transfer of data with respect to said data means, said control means including means for timing the occurrence of said control information fields with respect to a predetermined point positioned so as to be stationary relative to the rotation of said surface, first means enabled by the receipt of power, for transferring data to and from said data means, and second means for selectably providing power to said first means, said control means, responsive to said timing means, selecting said second means to selectively provide power to said first means immediately prior to the rotational passage of a predetermined control information field with respect to said predetermined point as determined from said timing means.

3. The system of claim 2 further comprising third means for receiving requests from the host computer, wherein a data field is associated with said predetermined control information field and wherein said control means deselects said second means to discontinue the provision of power to said first means after the rotational passage of said predetermined control information field by said predetermined point in the absence of a request by said host computer for said control means to transfer data with respect to said data field associated with said predetermined control information field.

4. The system of claim 3 wherein said control means further includes fourth means for controlling the transfer of data to and from said data means, said fourth means including said first means, wherein said second means further provides for the provision of power to said fourth means, and wherein said control means further provides for selecting said seconds means to provide power to said fourth means in response to a request by said host computer to transfer data and to discontinue the provision of power to said fourth means a predetermined period of time after said request by said host computer to transfer data, said control means discontinuing the provision of power to said fourth means in conjunction with discontinuing the provision of power to said first means.

5. A data storage system, responsive to a host computer, providing for the storage of data, said data storage system comprising:
    a) rotating media means for storing data, including primary data, at the surface of a rotating disk media, wherein said primary data is stored in discrete primary data fields, said rotating media means rotating said disk media in response to enabling power;
    b) data channel means for transferring data, said data channel means including a data transducer for reading and writing data with respect to said rotating disk media;
    c) actuator means, coupled to said data transducer, for positioning said data transducer with respect to said rotating disk media;
    d) power transfer means, responsive to power transfer select signals, for selectably providing said enabling power to said rotating media means, said data channel means, and said actuator means, the rotation of said disk media rotating media means, said data channel means, and said actuator means being disabled in the absence of the transfer of enabling power thereto by said power transfer means; and
    e) system control means for providing said power transfer select signals to said power transfer means, said system control means including timer means for timing the occurrence of said primary data fields with respect to said data transducer, wherein said system control means, responsive to said timer means, selectively projects the expected time of occurrence of the next one of said primary data field with respect to said data transducer and selectively provides said power transfer select signals to enable said data channel means prior to and for the duration of the expected occurrence of a predetermined primary data field with respect to said data transducer.

6. The data storage system of claim 5 wherein the data stored by said rotating media means includes servo data, wherein said servo data is stored in discrete servo data fields interspersed with said primary data fields at the surface of said rotating disk media, and wherein said system control means, responsive to said timer means, provides said power transfer select signals to enable said data transfer means prior to and for the duration of the expected occurrence of a predetermined series of said servo data fields with respect to said data transducer.

7. The data storage system of claim 5 or 6 wherein said system control means is responsive to requests from said host computer for the transfer of primary data, wherein said system control means includes delay means for detecting a predetermined delay between transfers of primary data, wherein said predetermined delay is greater than the duration of a servo data field and a primary data field and wherein said system control means is responsive to said delay means for the withdrawal of said power transfer select signals upon detection of said predetermined delay, whereby said rotating media means, data transfer means and actuator means are disabled.

* * * * *